Figure 1:
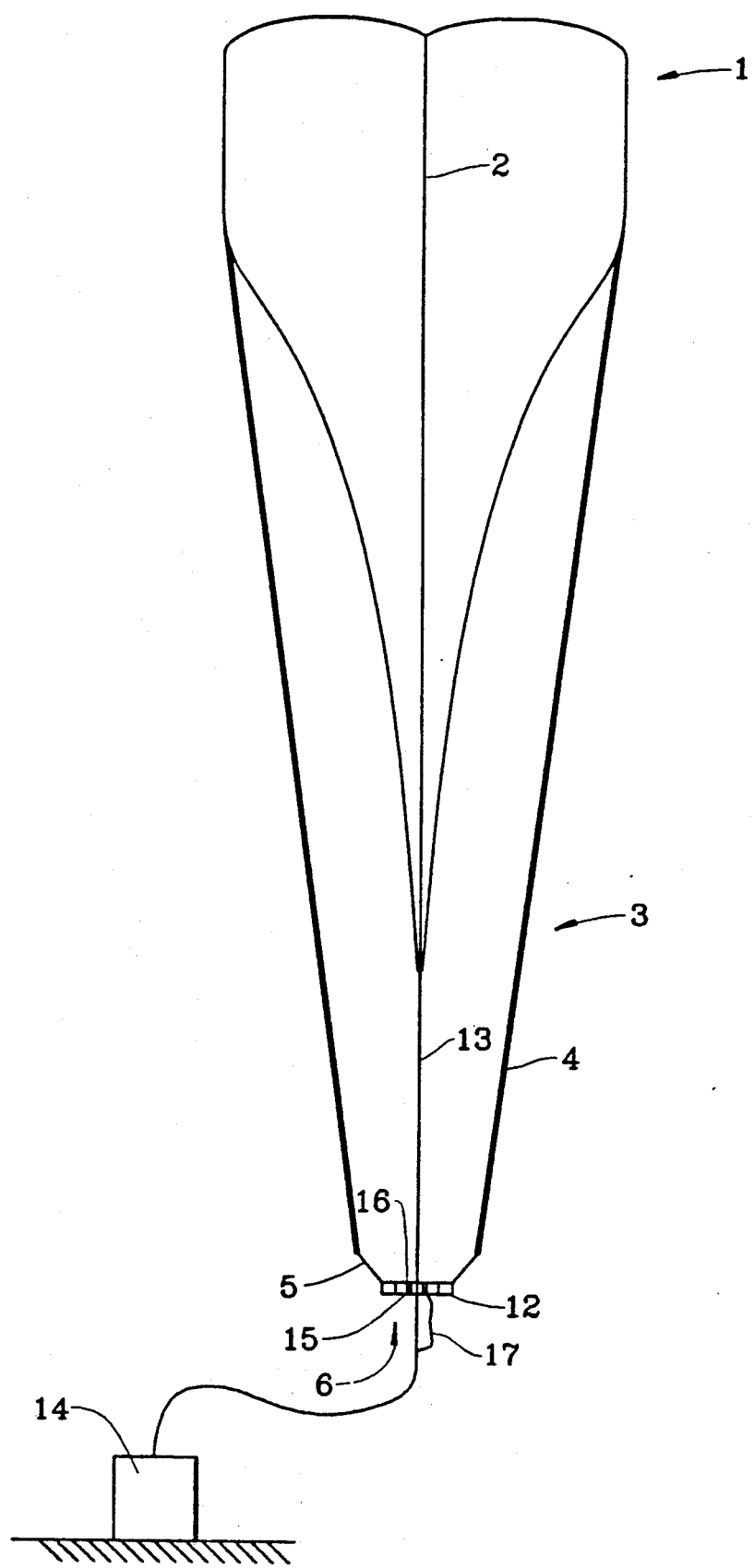

United States Patent [19]

Regipa et al.

[11] Patent Number: 5,076,513
[45] Date of Patent: Dec. 31, 1991

[54] AEROSTAT INTENDED TO TRAVEL IN AN AUTONOMOUS AND REVERSIBLE MANNER BETWEEN THE GROUND OF A PLANET HAVING AN ATMOSPHERE AND A PREDETERMINED CEILING ALTITUDE

[75] Inventors: Robert Regipa, Toulouse; Jacques Villaeys, Castanet, all of France

[73] Assignee: Centre Nationale d'Etudes Spatiales (C.N.E.S.), Paris, France

[21] Appl. No.: 397,413
[22] PCT Filed: Nov. 28, 1988
[86] PCT No.: PCT/FR88/00583
   § 371 Date: Aug. 4, 1989
   § 102(e) Date: Aug. 4, 1989
[87] PCT Pub. No.: WO89/05264
   PCT Pub. Date: Jun. 15, 1989

[30] Foreign Application Priority Data
   Dec. 2, 1987 [FR] France ............................ 87 16842

[51] Int. Cl.⁵ .......................... B64B 1/40; B64B 1/62
[52] U.S. Cl. ........................................ 244/31; 244/97; 244/128
[58] Field of Search ............... 244/31, 33, 96, 97, 244/98, 99, 126, 127, 128

[56] References Cited

U.S. PATENT DOCUMENTS

| | | |
|---|---|---|
| 3,484,058 | 6/1969 | Struble . |
| 3,565,368 | 2/1971 | Byron ............................ 244/31 |
| 3,773,279 | 11/1973 | Wright . |
| 4,174,082 | 11/1979 | Eshoo ............................ 244/31 |
| 4,394,998 | 7/1983 | Taillet . |
| 4,420,130 | 12/1983 | Regipa ............................ 244/31 |
| 4,711,416 | 12/1987 | Regipa ............................ 244/31 |

FOREIGN PATENT DOCUMENTS

| | | |
|---|---|---|
| 1535761 | 7/1968 | France . |
| 2360089 | 7/1978 | France . |

Primary Examiner—Galen Barefoot
Attorney, Agent, or Firm—Harold H. Dutton, Jr.

[57] ABSTRACT

The invention relates to an aerostat of the double balloon type intended to travel in an autonomous and reversible manner between the ground of a planet having an atmosphere and a predetermined ceiling altitude. This aerostat is of the type comprising a first closed carrier balloon (1) for containing a gas lighter than the gas present in the atmosphere, and a solar hot air balloon (3) comprising a permanent opening (6) permitting its filling by the gas present in the atmosphere. According to the invention the solar hot air balloon is provided at its upper extremity with an opening defined by an annular border, and means for sealingly securing this annular border to the peripheral wall of the carrier balloon (1), such that said carrier balloon extends partially into the interior of the envelope of the hot air balloon (3).

10 Claims, 5 Drawing Sheets

AEROSTAT INTENDED TO TRAVEL IN AN AUTONOMOUS AND REVERSIBLE MANNER BETWEEN THE GROUND OF A PLANET HAVING AN ATMOSPHERE AND A PREDETERMINED CEILING ALTITUDE

The invention relates to an aerostat intended to travel in an autonomous and reversible manner between the ground of a planet having an atmosphere and a predetermined ceiling altitude.

One of the near future objectives of space conquest is to send a mission to the planet Mars. For this reason, several techniques have been proposed in order to explore this planet. Among these techniques, has been envisaged the provision of a space balloon able to travel in an autonomous and reversible manner between the ground of the planet and a predetermined altitude. This solution presents in effect the advantage of permitting simultaneously a study of the ground of the planet and the atmosphere surrounding the planet. Such an objective cannot be achieved by drawing inspiration from the techniques used for providing captive balloons such as described particularly in U.S. Pat. No. 3,773,279, or the free balloons described in French Patent 1,535,761, or U.S. Pats. 3,484,058 and 4,394,998.

For this reason, the studies carried out have been oriented toward the provision of a space balloon conceived for conquering the relative radiation balance between the day and the night, in such a manner as to absorb the radiation from the altitude during the day and to lose it during the night.

In this sense, a first solution consisted in providing a space balloon comprising a closed envelope containing a gas which is lighter than the gas present in the atmosphere, provided with an internal metallized face in order to permit a sufficient reheating of this gas. The mass of gas is further adapted such that the balloon cannot leave the ground during the night by reason of the low temperature of the gas, and gain altitude during the day upon reheating of this gas. This solution, the great advantage of which resides in its simplicity, nevertheless presents a fundamental disadvantage. In effect, on the ground, the volume of gas enclosed in the envelope is low, and when the space balloon arrives at its ceiling, the same mass of gas occupies the total of the envelope because of the low pressure of the ambient atmosphere. This very hot gas causes great overpressures which can lead to bursting of the space balloon. To sustain these overpressures, the only solution is to provide an envelope of a very strong material. However, this solution is not adapted to the nature of the mission by reason of the significant weight of such an envelope, incompatible with transportation by satellite.

To overcome this inconvenience, a second solution has consisted in coupling a first balloon, comprising a closed non-metallic envelope by means of a connection to a solar hot air balloon having a permanent opening. This solution is described in French Patent 2,360,089 and has consisted of combining the effects of a carrier balloon providing a constant ascending force which is insufficient to permit the assembly to gain altitude, and a hot air balloon furnishing a rising force which varies as a function of the temperature and the density of the gas available in the ambient atmosphere. This hot air balloon thus furnishes a maximum ascending force at low altitudes which diminishes in relation to the elevation of the assembly. The risks of an over pressure condition of the carrier balloon are therefor diminished. However, this solution also has disadvantages. In effect the risks of an overpressure condition of the carrier balloon, while reduced, exist just the same by reason of the ascending force of the hot air balloon which encloses a very hot gas. Moreover, the launching of such a system from the ground is very hazardous, particularly in the case of violent winds. In effect, when the assembly is on the ground, the carrier balloon and the hot air balloon are maintained above the ground due to the lift of the carrier balloon. The hot air balloon is therefor subject to the action of the wind and may be emptied and take the shape of a spinnaker if it is not provided with an interpolar connection, or extending itself around its interpolar connection if, as described in French Patent 2,360,089, it is provided. In one case or the other, the beginning of its filling will be very hazardous.

The present invention seeks to overcome the disadvantages of the above described aerostats and has as its essential object to provide an aerostat capable of travelling in an autonomous and reversible manner between the ground of a planet and a predetermined ceiling altitude without risk of an overpressure condition at the ceiling altitude and not departing from the ground.

Another object is to provide an aerostat of a relatively light weight and having a good ratio of ascending force to mass.

Another object is to provide an aerostat of a conception adapted to permit any type of mission desired.

To this end, the invention relates to an aerostat of the double balloon type comprising:

a first carrier balloon comprising a closed envelope defining an upper pole and a lower pole and intended to contain a gas which is lighter than the gas present in the ambient atmosphere, a second, hot air balloon comprising an envelope produced from a material able to absorb solar radiation and emit infrared radiation to the interior of the volume which it defines so as to heat the enclosed gas, said envelope comprising a lower extremity having a permanent opening intended to permit refilling of the hot air balloon by the gas present in the ambient atmosphere.

According to the present invention, this aerostat is characterized in that:

the carrier balloon is formed of an envelope having a symmetry of revolution about an axis and produced from a material transparent to the solar radiation and comprising an essentially cylindrical portion, and an upper pole and a lower pole situated on the axis of revolution, the solar hot air balloon comprises an envelope having a symmetry of revolution about an axis and including an essentially cylindrical portion provided:

with an open extremity opposite its lower extremity and defined by an annular rim of a cross-section conjugate to that of the carrier balloon, with a flattened bottom including a permanent opening, sealed fixing means for the securing the annular rim of the hot air balloon to the peripheral wall of the carrier balloon and adapted to securely connect the envelopes of the carrier balloon and the hot air balloon so that the carrier balloon extends partially into the interior of the envelope of the hot air balloon.

The basic idea of the invention it therefor to associate a carrier balloon with a constant mass and variable volume with a solar hot air balloon of a variable mass and volume which has:

a maximum volume on the ground and in the lower layers in order to obtain a maximum effectiveness upon leaving the ground, and in the lower layers, a lower volume at altitude which confers a low effectiveness, almost nil, in order to avoid placing under pressure and bursting of the carrier balloon.

The process for producing such an aerostat is of the type comprising:

providing a first closed envelope, termed carrier balloon, defining a lower pole and a upper pole and intended to enclose a gas lighter than the gas present in the atmosphere, providing by means of a material able to absorb solar radiation and eminent infrared radiation a second envelope, termed the hot air balloon, comprising a lower extremity provided with a permanent opening.

This process is characterized in that it comprises:

estimating the variation in lift per unit of volume, of the hot air balloon in the absence of and in the presence of solar radiation and determining the volume of this hot air balloon necessary to obtain the launching of the aerostat, and the load carried thereby, determining a mass of gas ml which, in the absence of solar radiation is:

necessary in the carrier balloon to assure maintaining the carrier balloon and the hot air balloon above the ground, less than the mass of gas necessary in the carrier balloon to achieve launching of the aerostat and the load, providing a carrier balloon comprising an envelope of a material transparent to solar radiation and having a symmetry of revolution about an axis and comprising an essentially cylindrical portion, and an upper pole and a lower pole situated on the axis of revolution, said carrier balloon being of dimensions adapted such that its volume is essentially greater that the volume occupied by the mass of gas ml at the predetermined ceiling altitude, providing a hot air balloon having a symmetry of revolution about an axis and an essentially cylindrical portion having:

an open upper extremity defined by an annular rim of a cross section conjugate with that of the carrier balloon, a flattened bottom comprising a permanent opening, engaging that hot air balloon around the carrier balloon at its annular edge in such a manner that:

the carrier balloon extends partially into the interior of said hot air balloon, the annular edge of the hot air balloon is positioned opposite a zone of the cylindrical portion of the carrier balloon urged into circumferential tension, on the ground, for a mass of gas ml, the residual volume of the hot air balloon on the ground corresponds to the volume necessary to obtain the launching of the aerostat and the load, fastening the annular border of the hot air balloon to the periphery of the envelope of the carrier balloon.

The reliability of the operation of this aerostat rests on the following points:

the fastening of the hot air balloon is carried out on a portion of the envelope of the carrier balloon which is urged into circumferential tension, on the ground, in such a manner as to confer on the hot air balloon a significant residual volume. The least reheating of the mass of gas thus enclosed in the interior of the hot air balloon brings about a rapid filling thereof. It should be noted, further, that this residual volume is also the moreso important than the volume of the carrier balloon is less important on the ground, by reason of the significant gas pressure present in the atmosphere, upon launching, and in the lower layers, the hot air balloon rapidly acquires its maximum volume and thus furnishes the maximum lifting force, in relation to the ascent, the expansion of the mass of gas contained in the carrier balloon causes differentially the reduction of the volume of the hot air balloon and as a result a reduction in the lifting force thereof, when the sun is positioned at the zenith, the fact that the hot air balloon does not have a dome causes a reduction in the heating of the gas which it encloses.

These latter two points work together in order that the pressure of the hot air balloon is progressively weaker in relation to the ascent, and that as a result, the aerostat does not climb as high as the aerostats described before. The risks of causing an overpressure in the carrier balloon are thus reduced.

It should also be noted that the lift of this aerostat is assured in large part by the carrier balloon which guarantees against any risk of the balloon falling. The hot air balloon itself permits providing a balance of pressure which permits obtaining fluctuations and as a result a control in the vertical direction.

Such an aerostat further presents an overall thermo-optical coefficient which can be controlled as a function of its elongation and the nature of the materials of the envelopes of the carrier balloon and the solar hot air balloon. Elongation and the nature of the materials constitute parameters which are easily mastered. For this reason, the overall thermal balance of such an aerostat is completely controlled, and its characteristics may be adapted to the type of mission desired with the guarantee of a natural launching at the beginning of the day, a rapid ascent upon rising of the sun, and a minimum heating of the carrier balloon at the ceiling altitude, suppressing all risk of bursting.

Other characteristics and advantages of the invention will become apparent from the detailed description which follows with reference to the attached drawings which show, by non-limiting example, a preferred embodiment.

Figure 2:
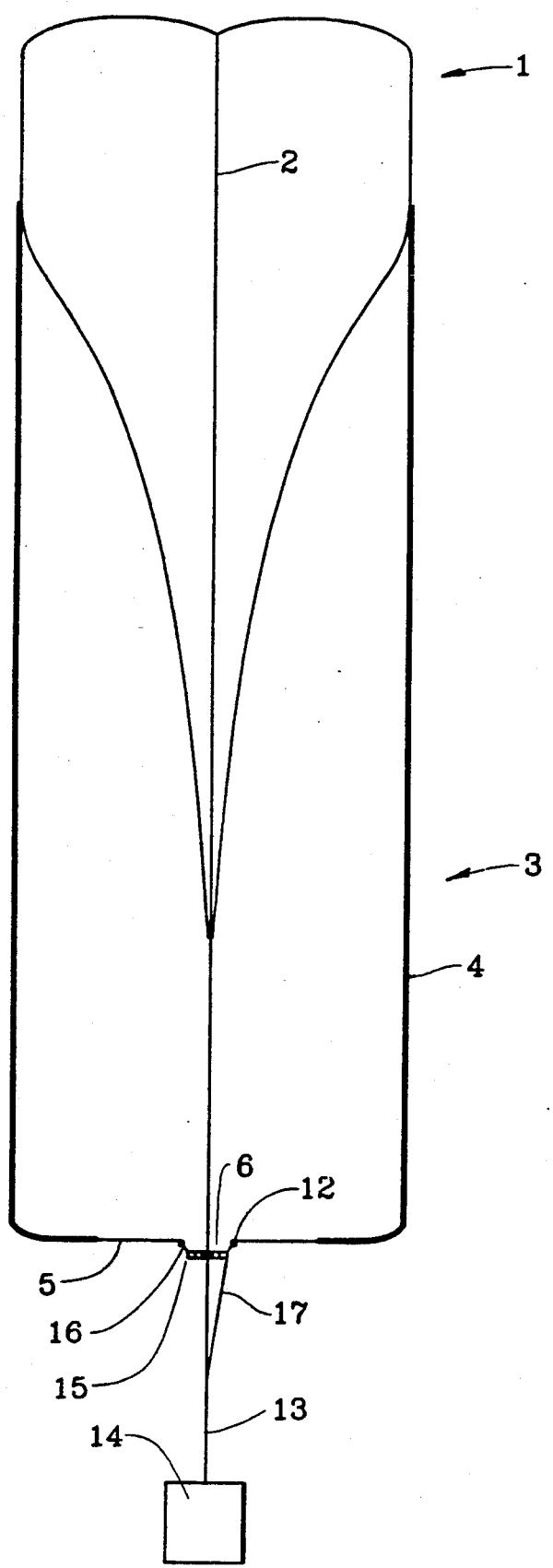
Figure 3:
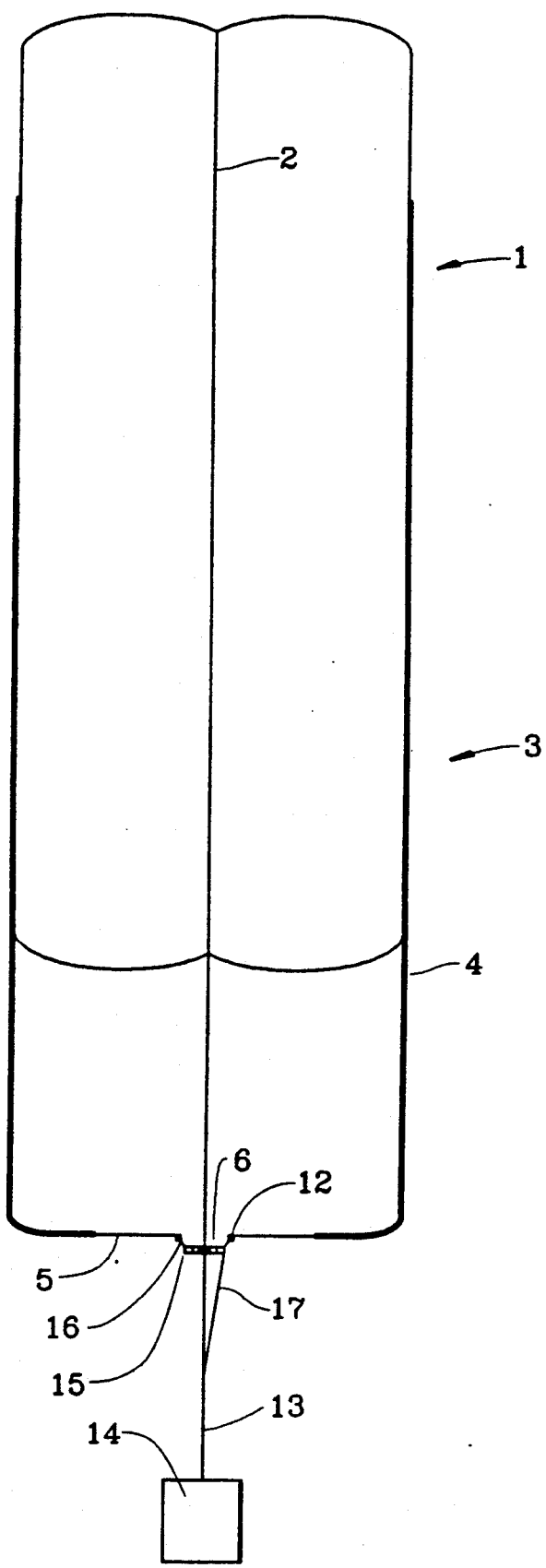
Figure 4:
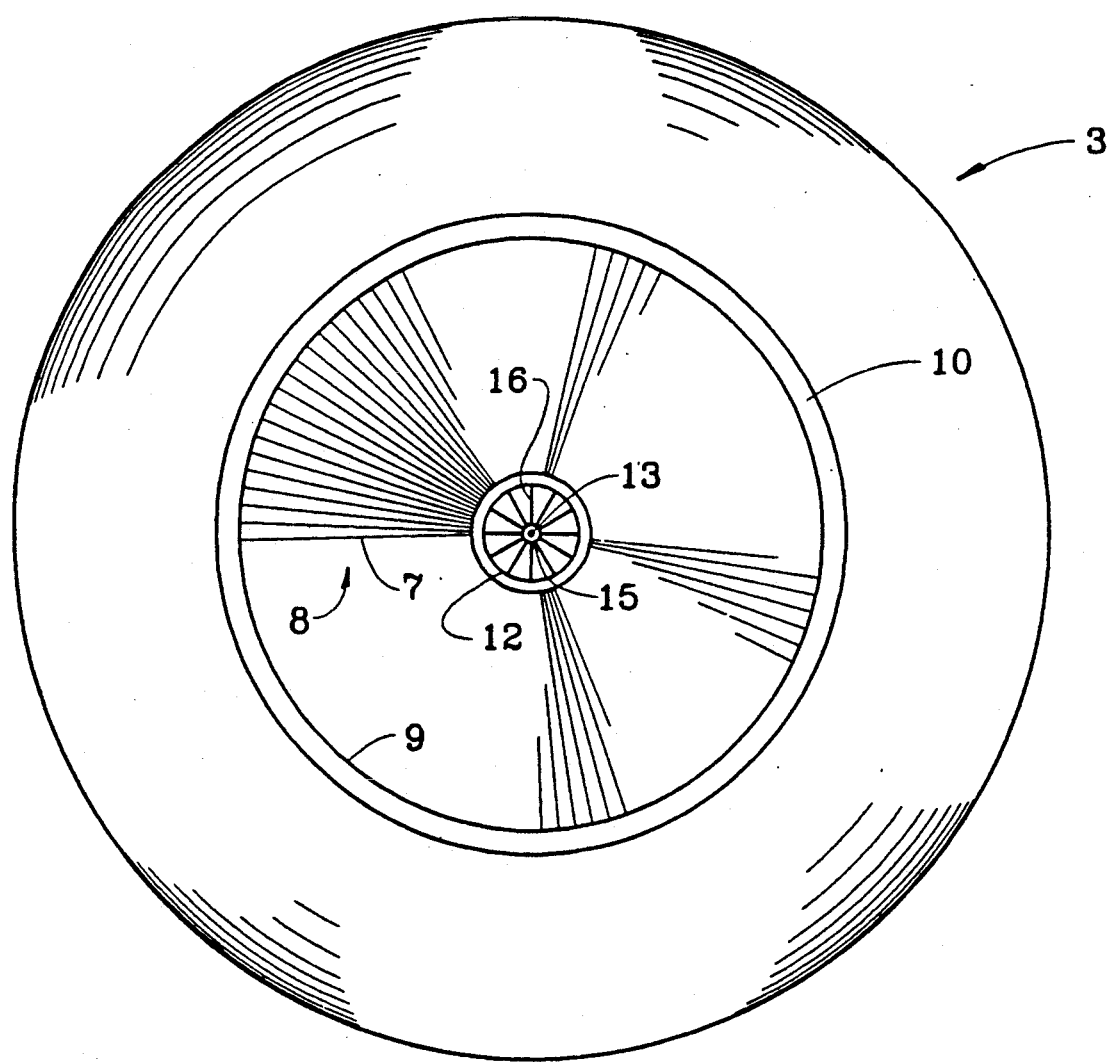
Figure 5A:
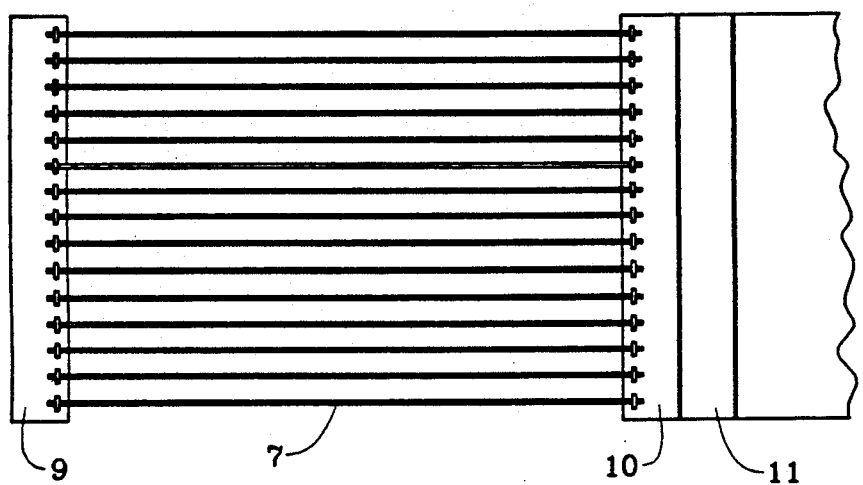
Figure 5B:
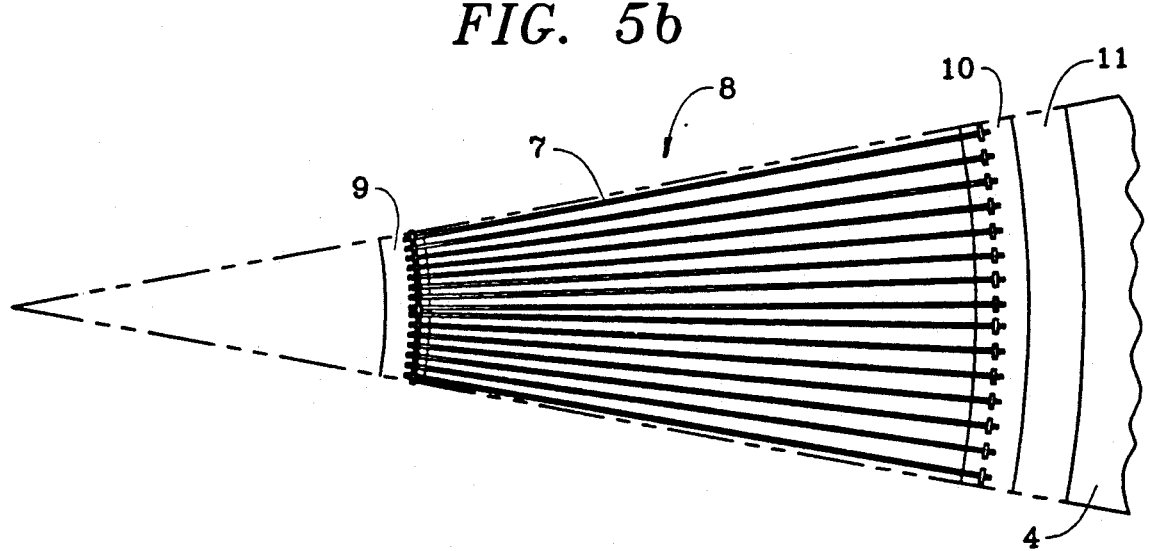

In these drawings which form an integral part of the present description;

FIG. 1 is a longitudinal cross-section along a vertical plane of an aerostat according to the invention, located in proximity to the ground, FIG. 2 is a longitudinal cross-section thereof along a vertical plane in the lower layers of the atmosphere, FIG. 3 is a longitudinal cross-section thereof along a vertical plane at its ceiling altitude, FIG. 4 is a bottom view of the flattened bottom of a hot air balloon according to the invention, FIGS. 5a and 5b illustrate two steps in the production of the flattened bottom of this hot air balloon.

The aerostat shown in FIGS. 1, 2 and 3 is intended to travel in a reversible and autonomous manner between the ground of a planet having an atmosphere, such as Earth or Mars, and a predetermined ceiling altitude.

This aerostat comprises first a carrier balloon 1 comprising an envelope having a symmetry of revolution about an axis, provided with an essentially cylindrical portion and an upper pole an a lower pole situated on this axis of revolution.

This envelope is made from rectangular gores of a polyester film of 3.5 microns thickness, according to the process described in French Patent 80.00343 in the name of the present applicant. This envelope comprises an interpolar connection 2 connecting its upper pole and its lower pole.

The envelope of this carrier balloon 1 encloses a mass of gas ml lighter than the gas present in the atmosphere. This mass of gas ml is calculated in such a manner that the carrier balloon 1 has:

a state of being full at a predetermined ceiling altitude greater than the ceiling altitude provided in the conditions of exploration in such a manner that the envelope is never placed into overpressure, a state of minimal inflation on the ground for which: the upper portion of the envelope is urged into circumferential tension, it has a sufficient lift to maintain the aerostat above the ground and insufficient to bring about launching of this aerostat and its load.

The aerostat comprises secondly, a second solar hot air balloon envelope 3, having a symmetry of revolution about an axis, comprising an essentially cylindrical portion 4 and a flattened bottom 5 provided with a permanent opening 6.

The cylindrical portion 4 of this envelope has a cross-section conjugate with that of the envelope of the carrier balloon 1, and it provided with an open extremity defined by an annular rim or border. This cylindrical portion 4 is produced, as before, by assembly of rectangular gores of a polyester film of 3.5 microns thickness. The internal face of these gores is further coated with a thin metallic film, for example aluminum.

Such an envelope permits reheating of the gas which it encloses. In effect, the solar radiation is absorbed by the polyester film which transmits the radiation by conduction to the metallic film. This film re-emits the radiation then in the form of infrared radiation to the interior of the envelope.

This cylindrical portion 4 is threaded around the carrier balloon 1 by its annular edge in such a manner as to extend partially into the extension of the lower pole of the latter. It is then fixed in a sealing manner to the periphery of the envelope of the carrier balloon 1 on a portion which urges it into circumferential tension when said carrier balloon is in proximity to the ground. It should be noted that the production of these two envelopes and their securing may be carried out simultaneously by means of an apparatus such as describes in French Patent Application 86.03553 in the name of the applicant. The fixing of the annular edge of the hot air balloon 3 to the carrier balloon 1 comprises, firstly glueing or adhering said annular edge to the carrier balloon. Then, a circumferential ribbon is arranged around the annular rim and finally the ribbon is glued to the carrier balloon 1 and the hot air balloon 3.

The flattened bottom 5 of the envelope is itself produced from a material which is permeable to the gas in the ambient atmosphere. It may be formed of a largely porous fabric. One embodiment which is illustrated in FIGS. 4, 5a and 5b comprises using fibers 7 of the same length spaced one from the others and extending radially with respect to the axis of revolution of the hot air balloon 3. The production of the flattened bottom 5 is achieved by making up several similarly formed gores 8, each of a plurality of spaced fibers 7.

The process carried out for production these gores 8 is shown in FIGS. 5a and 5b. The fibers 7, of a material such as polyester or polyamide, are arranged parallel one to the others on a table.

They are fixed, at one of their extremities, to a flexible elastic band 9 which held in extension on the table. At their other extremity, they are sewn to a band 10 of a flexible fabric having elastic properties with respect to the polyester film forming the cylindrical portion 4. The object of this intermediate band 10 is to dampen stresses in such a manner as to not transmit to the polyester film the possible irregularities of forces to which the fibers 7 are subjected, to avoid any risk of tearing the film.

The connection between the intermediate band 10 and the gore of polyester film is finally assured by a ribbon of polyethylene 11. Once these assemblies are achieved, the flexible elastic band 9 is released, in such a manner that each gore 8 forms a circular sector centered on the axis of revolution of the hot air balloon 3.

Each of these gores 8 is then fixed, through the flexible elastic band 7, to an annular piece 12 defining the permanent opening 6 of the hot air balloon 3.

The hot air balloon 3 also comprises an interpolar connection 13 fixed to the lower pole of the carrier balloon 1 in the extension of the interpolar connection 2 thereof, and extends below the lower pole of the hot air balloon 3, in order to support a load 14.

This interpolar connection 13 is guided at the level of the lower pole of the hot air balloon 3, by means of an annular guide 15 centered on the axis of revolution of this hot air balloon and secured to the annular piece 12 by means of radial fixing members 16. These fixing members 16 may, for example, be formed of cables of "Kevlar".

The hot air balloon 3 also includes an auxiliary strand 17 fixed at one end to the interpolar connection 13 between the load 14 and the lower pole of this hot air balloon, and at the other end to a guide rim 15. This auxiliary strand 17 has a length adapted to be drawn into tension at a predetermined state of filling of the hot air balloon 3. The purpose of such a strand is to cause the envelope of the hot air balloon 3 to undergo a longitudinal tension, by passing through the envelope a part of the load 14 carried by the space balloon. One thus avoids any risk of wind damage to this envelope which could destroy the latter.

The various elements constituting the aerostat and their arrangement having been described, the characteristics of the operation will now be explained.

This aerostat is particularly intended to be transported by means of a satellite and then parachuted to the proximity of the planet Mars, to carry out the exploration thereof. After the parachuting, the means for inflating the carrier balloon with a gas such a helium, lighter than the gas present in the atmosphere, will permit filling of this carrier balloon with a predetermined mass of gas. The evolution cycle of the space balloon between the ground of the planet and a predetermined ceiling altitude is then as follows.

During the night, the temperature of the gas present in the atmosphere, and thus the gas contained in the hot air balloon 3, is relatively low. The hot air balloon 3 therefor does not produce any lift or rising force. The aerostat then is found in proximity to the ground with the load 14 resting thereon, only under the lift of the carrier balloon 1 (FIG. 1).

At day break, the slight heating of the gas present in the atmosphere causes a rapid filling of the hot air balloon 3 due to its significant residual volume. This latter reaches its filled state and provides a maximum force for the launch and into the lower layers. Further, in the filled state of the hot air balloon 3, the tensile forces of the auxiliary strand 17 assures against any risk of wind damage (FIG. 2). It should also be noted that the fact that the hot air balloon 3 has a sizeable residual volume permits reducing the mass of gas contained in the carrier balloon 1, and as a result, the weight of the inflating means therefor. This latter point is very important from the perspective of a launching by satellite where any increase in weight is very significant.

In relation to the elevation of the aerostat, the volume of the carrier balloon 1 increases from the fact of reduced pressure of the atmosphere, and as a result, the volume of the hot air balloon 3 decreases proportionally (FIG. 3). Its lifting force therefor reduces, and this is particularly the case since the heating of the gas is less when the sun is at its zenith because of the absence of a dome.

Finally, when the sun goes down, the temperature of the gas contained in the hot air balloon 3 decreases progressively, causing a slow descent of the aerostat towards the ground.

The dimensional characteristics of such an aerostat will be a function of the type of mission planned. As a general rule, the aspect ratio of the carrier balloon 1 (the ratio of its height to diameter) will be equal to 2 or 3 times its variation in volume between the ground and the predetermined ceiling altitude.

Thus, for example, for the exploration of the planet Mars, with a ceiling altitude of 4 to 6 kilometers, the aspect ratio of the carrier balloon 1 will be 6 or 7, the ratio of density of the gas being essentially 2 between this altitude and the ground.

We claim:

1. An aerostat for travel in an autonomous and reversible manner between the ground of a planet having an atmosphere and a predetermined ceiling altitude, comprising:
   a carrier balloon (1) comprising a closed envelope defining an upper pole and a lower pole and intended to contain a gas lighter than the gas present in the ambient atmosphere,
   a hot air balloon (3) comprising an envelope of a material capable of absorbing solar radiation and emitting infrared radiation to the interior of the hot air balloon in such a manner as to heat the enclosed gas, said envelope comprising a lower extremity having a permanent opening (6) for filling the hot air balloon (3) with the gas present in the ambient atmosphere,
   said carrier balloon (1) comprising an envelope having a symmetry of revolution about an axis and produced from a material transparent to solar radiation and comprising an essentially cylindrical portion, and an upper pole and a lower pole situated on the axis of revolution,
   said hot air balloon (3) comprises an envelope having a symmetry of revolution about an axis and further comprising an essentially cylindrical portion (4),
   said hot air balloon (3) having an open extremity opposite its lower extremity and defined by an annular edge of an annular cross section conjugate with that of the carrier balloon, and a flattened bottom (5) comprising a permanently opening (6),
   gas tight fastening means securing the annular edge of the hot air balloon to the peripheral wall of the carrier balloon (1), and adapted to secure the envelopes of aid carrier balloon and said hot air balloon so that the carrier balloon (1) extends partially into the interior of the envelope of the hot air balloon (3).

2. An aerostat as in claim 1 wherein the hot air balloon (3) includes an annular piece (12) of a rigid material defining its permanent opening (6), characterized in that the flattened bottom (5) of said hot air balloon is made of a material permeable to the gas present in the ambient atmosphere.

3. An aerostat as in claim 2, and wherein said flattened bottom (5) of the hot air balloon (3) is formed of a plurality of strands (7) of the same length and spaced radially with respect to the axis of revolution of said hot air balloon, said strands being fixed near one of their extremities to a strip of flexible material adapted to be secured to the annular piece (12), and toward their opposite extremity to an intermediate strip (10) of a material elastic with respect to the material comprising the cylindrical portion (4), the lower extremity of said cylindrical portion being secured to said intermediate strip (10).

4. An aerostat as in claim 3, and wherein said hot air balloon (3) includes:
   an interpolar connection (13) fixed to the lower pole of the carrier balloon (1) and extending below the lower pole of said hot air balloon for supporting a load (14),
   a guide rim (15) for the interpolar connector (13) centered on the axis of revolution of said hot air balloon at the level of its lower pole and fixed to the annular rim (12) by means of radial securing members (16).

5. An aerostat as in claim 4 and wherein said interpolar connection (13) of the hot air balloon (3) extends above the lower pole of the carrier balloon (1) so as to connect the latter to the upper pole of said carrier balloon.

6. An aerostat as in claim 5, and further comprising an auxiliary strand (17) fixed at one end to the interpolar connection (13) between the load 14 and the lower pole of the hot air balloon (3) and at the other end to the guide rim (15), said auxiliary strand being of a length adapted to be placed under tension for a predetermined state of filling of the hot air balloon (3).

7. An aerostat as in claim 1 and wherein said envelopes of the carrier balloon (1) and of the hot air balloon (3) are made of polyester of 3.5 microns thickness, the envelope of the hot air balloon (3) being coated internally with a metallized layer.

8. A process for producing an aerostat for carrying a load (14) and travelling in a reversible and autonomous manner between the round of a planet having an atmosphere and a predetermined ceiling altitude comprising:
   providing a closed carrier balloon envelope (1) defining a lower pole and an upper pole for enclosing a gas lighter than the gas present in the atmosphere,
   providing a hot air balloon having an envelope (3) of a material able to absorb solar radiation and emit infrared radiation, and comprising a lower extremity having a permanent opening (6).
   estimating the variation of lift per unit of volume of the hot air balloon (3) in the absence and in the presence of solar radiation and determining the volume of this hot air balloon (3) necessary to obtain the launching of the aerostat and the load,
   determining a mass of gas ml which is, in the absence of solar radiation;

necessary in the carrier balloon (1) to assure the support of said carrier balloon (1) and the hot air balloon (3) above the ground, and less than the mass of gas necessary in the carrier balloon (1) to assure the launching of the aerostat and the load (14), providing said carrier balloon (1) of a material transparent to solar radiation and having a symmetry of revolution about an axis and comprising an essentially cylindrical portion, and an upper pole and a lower pole situated on the axis of revolution, said carrier balloon being of dimensions adapted so that its volume is essentially greater than the volume occupied by the mass of gas ml at the predetermined ceiling altitude, providing said hot air balloon (3) with a symmetry of revolution about an axis and an essentially cylindrical portion having:

an open upper extremity defined by an annular edge of a cross-section conjugate with that of the carrier balloon (1), a flattened bottom (5) comprising a permanent opening (6), surrounding the hot air balloon (3) about the carrier balloon (1) at its annular edge in such a manner that:

the carrier balloon (1) extends partially into the interior of the hot air balloon (1), the annular edge of the hot air balloon is positioned opposite a zone o the cylindrical portion of the carrie balloon placed into circumferential tension on the ground for a mass of gas ml, the residual volume of the hot air balloon (3) on the ground corresponds to the volume necessary to obtain the launching of the aerostat and the load (14), and securing the annular rim of the hot air balloon (3) to the periphery of the envelope of the carrier balloon (1).

9. A process for producing an aerostat as in claim 8, and wherein the securing of the annular edge of the hot air balloon (3) to the carrier balloon (1) comprises:

adhering said annular edge to said carrier balloon, arranging a circumferential strip about the annular edge of the hot air balloon (3) and adhering this strip respectively to the carrier balloon (1) and to said hot air balloon.

10. A process for launching an aerostat as in claim 1 carrying a load (14), and including filling the carrier balloon (1) with a mass ml of gas lighter than the gas present in the atmosphere said mass being, such that said balloon has:

a state of being full at a predetermined ceiling altitude, a state of minimum inflation on the ground for which it has a lift sufficient to maintain the carrier balloon (1) and the hot air balloon (3) above the ground and insufficient to bring about the launching of the aerostat and the load (14).

* * * * *